United States Patent Office 3,577,483
Patented May 4, 1971

3,577,483
PROCESS FOR THE PREPARATION OF PHOSPHORIC ACID ESTERS BY REACTION OF PHOSPHORUS OXYCHLORIDE WITH ALKYLENE OXIDES
Arnold Kotzschmar, Burgkirchen (Alz), Hermann Metzger, Burghausen (Salzach), and Richard Reinhard Gustav Adolf Rothe, deceased, late of Altotting, by Rudolfine Rothe, nee Roessler, heiress, Altotting, and Willy Seidel, Burgkirchen (Alz), Germany, assignors to Farbwerke Hoechst Aktiengesellschaft vormals Meister Lucius & Bruning, Frankfurt am Main, Germany
No Drawing. Filed Aug. 9, 1967, Ser. No. 659,533
Claims priority, application Germany, Aug. 13, 1966, F 49,943, Patent 1,290,532
Int. Cl. C07f 9/08; C08f 45/58
U.S. Cl. 260—977
5 Claims

ABSTRACT OF THE DISCLOSURE

Process for the continuous preparation of phosphoric acid esters having utility as plasticizers and for imparting flame resistant properties by reaction of phosphorus oxychloride with alkylene oxides, in which a large amount of the final product is used as reaction medium. The products produced according to the process of the present invention are superior to the discontinuously prepared esters because they have an extraordinarily low acid value.

---

The known reaction between phosphorus oxychloride and alkylene oxides forming the corresponding phosphoric acid esters which, so far, could only be carried out discontinuously in the presence of certain catalysts represents a strong exothermic and therefore violent reaction. The German patent specification No. 848,946 refers on page 1, lines 29–30 and on page 2, line 1 and following and lines 71–81, to the difficulties of carrying through and controlling the reaction which, under certain conditions may become uncontrollable and may lead to undesired side reactions.

Attempts were therefore not lacking to get this operation, by appropriate measures, proceeded as intended. Thus, in the German patent specification No. 1,032,240 modified Friedel-Crafts catalysts have been suggested, the halogens of which being partially or wholly replaced by organic radicals causing a more or less great reduction of the catalysts' activity. Moreover, with a view to a better removal of the heat and by that to a better control of the reaction, the procedure is carried out according to Examples 3 and 11 in the presence of a solvent.

The procedure according to the U.S. specification No. 2,157,164, column 1, line 28 and following is carried through similarly under reflux of the reactants using the evaporation heat for cooling and obtaining hereby a better control of the exothermic reaction.

Besides the difficulty to bring this reaction under safe control, it will only be successful when conducted within narrow limits of temperature. Exceeding these limits will cause side reactions impairing the output as well as the quality of the final product because of undesired impurities. Thus the British patent specification No. 710,090 refers to the thermal instability of such phosphoric acid esters which form acid final products by partially splitting off hydrochloric acid. This instability is, of course, a disadvantage in the use of these products. In the case of tris-($\beta$-chlorethyl)-phosphate obtained by reaction of phosphoric oxychloride with 3 moles of ethylene oxide and used as an excellent plasticizer and for improvement of the non-inflammability in cellulose acetate compositions, the acidity occurring at the required high working temperatures has an injurious effect on the cellulose acetate. Therefore, to improve the thermal stability of the tris-($\beta$-chloroethyl)-phosphate, several stabilizers are proposed in the said British specification.

With a view to the state of art it can be summed up that it was quite desirable to find a method according to which it would be possible to carry out the generally known reaction of phosphorus oxychloride with alkylene oxides in a safe and easily controllable manner and to obtain at the same time products of improved qualities.

Now it has been found that this can be obtained in a surprisingly simple manner when the reaction of the phosphoric oxychloride with alkylene oxides is carried out continuously by using, as reaction medium, a large amount of the final product. The continuous process is particularly suitable in the reaction described, since the final products represent clearly defined substances, whereas in the usual continuous oxalkylations homologous series with wide chain distributions are obtained.

The present invention relates to a process for the continuous preparation of phosphoric acid esters by reaction of phosphorus oxychloride with alkylene oxides, a process, according to which the reaction is carried through continuously in a large amount of the final product and the product is treated subsequently with an alkali, washed with water and dried in appropriate devices in a continuous manner.

A particularly advantageous way of carrying out the continuous process consists in introducing the reactants at opposite ends of a suitably equipped reactor so that they encounter therein. By this way, the reaction will be moderate, since the encounter of both reactants at high concentrations and thus any overheating will be avoided with certainty.

As alkylene oxides there may be used primarily alkylene oxides having 2 to 4 carbon atoms, as for instance ethylene oxide, propylene oxide and butylene oxide, as well as epichlorhydrin. The process is suitably carried out at temperatures ranging from 50° to 100° C., preferably from 60° to 70° C.

As reactors there are used preferably glass towers which are available, as is known, even in large sizes. Before beginning the reaction, these towers are filled with the final product and fed at their top with the phosphorus oxychloride and the catalyst, while the alkylene oxides are introduced at the bottom of the towers. The ratio in the reactor of the final product to the substances to be reacted per unit of time should be chosen sufficiently high to obtain by the dilution thus brought about a heat buffer being as large as possible. The ratio is 2:1 to 20:1, preferably 5:1 to 10:1.

The reaction itself thus described is followed by treating the raw product obtained with an alkali and by washing it with water. After elimination of the last traces of water, the product is dried rapidly and carefully. These various procedures are carried out continuously in appropriate devices. Experience has shown that the rapid continuous process, especially when drying the washed product, yields products with an excellent quality.

The following examples illustrate the invention, but they are not intended to limit it thereto.

EXAMPLE 1

A glass tower having a length of 1100 mm., an inner width of 65 mm., a capacity of 2500 ml., and being provided with a heat jacket was filled with tris-($\beta$-chloroethyl)-phosphate which was heated to 60° C. Then, 8.08 kg. of phosphorus oxychloride, containing 0.8% butyl titanate, were added dropwise at the top of the tower within 30 hours, while simultaneously 11.70 kg. of gaseous ethylene oxide were introduced into the lower part of the reaction tower (molar ratio phosphorus oxychloride:ethylene oxide=1:5, corresponding to an excess of ethylene oxide of about 70%). The reaction product obtained was continuously removed at the bottom of the tower, while the excess of ethylene oxide escaped at the top of the tower. It was condensated and thus recovered.

The quantity of raw product removed hourly from the reaction tower was about 500 g.=350 ml. (at a density of 1.4), so that the quantity of the tower filling to the quantity of the reaction product obtained was as 7:1. The raw tris-(β-chlorethyl)-phosphate thus obtained was treated, in another vessel, with an aqueous sodium hydroxide solution of 10% strength at a ratio of 4:1, while stirring, to be purified continuously from non-reacted phosphorus oxychloride and instable by-products. To avoid decomposition of the product by the alkali, the temperature was kept under 30° C.

Separation of both the liquid phases was effected in a separator in form of a horizontally arranged glass tube having a length of 1000 mm., an inner width of 50 mm. and a capacity of 1960 ml. The reaction product, which was specifically heavier, left the separator by the lower opening to get into the water bath, where it was washed continuously with water at a 1:1-ratio to eliminate the excess of alkali from the reaction mixture. Thereupon, both liquid phases were separated continuously at 40 to 45° C.

After being washed, the product obtained was free from alkali, though it still contained about 5% of water. The product was dried by sucking it through a capillary tube into a drying apparatus standing under vacuum. This drier consisted of 2 towers, 1500 mm. long each, arranged one after another, filled with Raschig rings and heated with steam from the outside. After the product had passed the second reaction tower, the remaining water content was below 0.2%. About 500 g. of pure dry tris-(β-chlorethyl)-phosphate could be obtained hourly at the end of the apparatus. The total yield was 14.75 kg.

EXAMPLE 2

In the same apparatus as described in Example 1, 3.725 kg. of phosphorus oxychloride containing 0.8% of butyl titanate, were reacted within 30 hours with 6.30 kg. of propylene oxide, which corresponded to a molar ratio of 1:4.5 at a simultaneous excess of propylene oxide of 50%. The liquid propylene oxide evaporated before it was introduced into the apparatus. 7.8 kg. of pure tris-(β-chloropropyl)-phosphate were obtained. In this case, the filling of the tower to the quantity of raw product produced hourly was about 13.5:1 (260 g.=187 cc.).

EXAMPLE 3

5.250 ml. of the final product were introduced into a 10 ml.-round-bottomed flask. Then, 915 g. of epichlorhydrin and 460 g. of phosphorus oxychloride, containing as catalyst 1% butyl titanate (molar ratio 1:3.3), were added regularly within 1 hour, while stirring well. The reaction temperature, which was to be between 60 and 70° C., was kept under control by external cooling. The reaction product was withdrawn from the reaction vessel in quantities corresponding to the added components by means of a drain tube equipped as a siphon. The quantity of the filling to that of the product withdrawn hourly was in this case as 6:1 (1292 g.=875 ml. at a density of 1.48). The product obtained was subsequently washed and dried as described in Example 1.

The quality of the product obtained was much better than that of a product obtained according to the discontinuous method.

EXAMPLE 4

27 kg. of phosphorus oxychloride were reacted hourly, on a semi-industrial scale, with 23.2 kg. of ethylene oxide in the presence of 0.8% butyl titanate (based on the phosphorus oxychloride) as catalyst in a reaction tower of glass having a capacity of 250 l. and equipped in its lower part with heating coils and in its upper part with an inner cooling device. After a test carried through continuously for 6 days, 7263 kg. of tris-(β-chlorethyl)-phosphate were obtained.

The ethylene oxide required for the reaction was taken from big pressure vessels from where it had been led with nitrogen first to an evaporator and from there, via measuring and security devices, to the reactor. It was fed into the latter above a temperate zone to bring about a thorough mixing of the tower's filling. The phosphorus oxychloride was led from two measuring vessels of glass (capacity 30 l.), which could be switched on at will, to the top of the tower by means of a dosage pump. The catalyst was added somewhat below the introduction zone of the phosphorus oxychloride.

Before starting the apparatus, it was filled with the final product and heated by the heating coils to 50° to 60° C. As soon as the charge of the tower was saturated with ethylene oxide the phosphorus oxychloride was added, whereupon the reaction started immediately. Instead of the heating coils the cooling device was now set running. Both the components were then added in the said proportion while a corresponding quantity of the raw product was withdrawn continuously from the reaction tower. This raw product was treated as usually with an alkali, washed with water and dried.

The products obtained according to the present invention are characterized by a particularly good quality. These esters are clear liquids almost colourless and odourless. Compared to products obtained by discontinuous procedures they had an extraordinarily low acid value and could be distilled under vacuum almost without being decomposed.

The following table shows a comparison between the products obtained by the discontinuous and those obtained by the continuous process.

COMPARISON OF STABILITY OF PRODUCTS OBTAINED BY THE DISCONTINUOUS AND CONTINUOUS PROCESS (VACUUM DISTILLATION)

|  | Quantity used, ml. | Distillate, ml. | Equals percent quantity used | Acid value of the distillate after | |
|---|---|---|---|---|---|
|  |  |  |  | 15 min. | 24 hours |
| (A) Reaction of POCl₃ with EO: |  |  |  |  |  |
| Discontinuously | 28 | 25.2 | 90.0 | 0.25 | 0.62 |
|  |  | 25.8 | 92.0 | 0.28 | 0.55 |
|  |  | 24.5 | 87.5 | 0.40 | 1.6 |
| Continuously, laboratory apparatus | 28 | 26.5 | 94.7 | 0.09 | 0.38 |
|  |  | 26.8 | 95.7 | 0.06 | 0.08 |
|  |  | 27.9 | 96.8 | 0.10 | 0.14 |
| Semi-industrial scale | 28 | 27.0 | 96.5 | 0.08 | 0.09 |
|  |  | 27.0 | 96.5 | 0.08 | 0.08 |
| (B) Reaction of POCl₃ with PO: |  |  |  |  |  |
| Discontinuously | 28 | 23.7 | 85.0 | 0.75 | [1] 1.4 |
| Continuously | 28 | 26.0 | 93.0 | 0.42 | 1.0 |
| (C) Reaction of POCl₃ with epichlorhydrin: |  |  |  |  |  |
| Discontinuously | 28 | 15.8 | 60.0 | 24.2 | 38.4 |
| Continuously | 28 | 23.7 | 85.0 | 5.3 | 16.2 |

[1] This stable product was obtained only after several washings with alkali.

NOTE.—EO=ethylene oxide. PO=propylene oxide.

3,577,483

We claim:
1. In a catalytic process for preparing phosphoric acid esters by reacting phosphorus oxychloride with alkylene oxides, the improvement which comprises continuously effecting the reaction of a member selected from the group consisting of ethylene oxide, propylene oxide, butylene oxide and epichlorhydrin at about 50–100° C. with phosphorus oxychloride in a reaction medium consisting essentially of the ester product at a ratio of final product-to-reactants of about 2:1 to 20:1 per unit of time, and continuously recovering the resulting product.

2. A process as claimed in claim 1, in which the ratio of submitted product to the amount of product hourly produced is 5:1 to 10:1.

3. A process as claimed in claim 1, wherein the reaction is carried out at a temperature between 60° and 70° C.

4. The process of claim 1 wherein the reactants are simultaneously and separately introduced into a reactor, said catalyst being contained in the phosphorus oxychloride.

5. In a catalytic process for preparing phosphoric acid esters by reacting phosphorus oxychloride with alkylene oxides, the improvement which comprises continuously effecting the reaction of a member selected from the group consisting of ethylene oxide, propylene oxide, butylene oxide and epichlorhydrin at about 50–100° C. with phosphorus oxychloride in the presence of a catalytic amount of butyl titanate and in a reaction medium consisting essentially of the ester product at a ratio of final product-to-reactants of about 2:1 to 20:1 per unit of time, and continuously recovering the resulting product.

References Cited

UNITED STATES PATENTS 2,157,164   5/1939   Daly _____ 260—977

CHARLES B. PARKER, Primary Examiner

A. H. SUTTO, Assistant Examiner

U.S. Cl. X.R.

260—30.6, 45.95, 963